(12) United States Patent
Alix et al.

(10) Patent No.: US 8,505,884 B2
(45) Date of Patent: Aug. 13, 2013

(54) PACKING STRUCTURE FOR FLUID CONTAINING COLUMN AND MANUFACTURING METHOD

(75) Inventors: Pascal Alix, Roussillon (FR); Rémi Bessettes, Tresses (FR); Charles Dumont, Lacanau de Mios (FR); Jean-Pierre Maumus, Saint Medard en Jalles (FR); Ludovic Raynal, Oullins (FR)

(73) Assignees: IFP Energies nouvelles, Rueil Malmaison Cedex (FR); Snecma Propulsion Solide, Le Haillan Cedex (FR)

( * ) Notice: Subject to any disclaimer, the term of this patent is extended or adjusted under 35 U.S.C. 154(b) by 682 days.

(21) Appl. No.: 12/531,938

(22) PCT Filed: Mar. 19, 2008

(86) PCT No.: PCT/FR2008/000366
§ 371 (c)(1),
(2), (4) Date: Mar. 19, 2010

(87) PCT Pub. No.: WO2008/135655
PCT Pub. Date: Nov. 13, 2008

(65) Prior Publication Data
US 2010/0180766 A1 Jul. 22, 2010

(30) Foreign Application Priority Data
Mar. 20, 2007 (FR) ...................................... 07 02070

(51) Int. Cl.
*B01D 47/14* (2006.01)
*B01F 3/04* (2006.01)

(52) U.S. Cl.
USPC .......................... 261/94; 261/95; 261/DIG. 72

(58) Field of Classification Search
None
See application file for complete search history.

(56) References Cited

U.S. PATENT DOCUMENTS

| | | | | |
|---|---|---|---|---|
| 2,981,665 A | * | 4/1961 | Kloss | 202/158 |
| 3,430,934 A | * | 3/1969 | Weishaupt | 261/94 |
| 4,762,650 A | * | 8/1988 | Bosman | 261/100 |
| 5,225,116 A | * | 7/1993 | Menzel et al. | 261/94 |
| 5,536,454 A | * | 7/1996 | Fujii et al. | 261/97 |
| 7,748,688 B2 | * | 7/2010 | Bessettes et al. | 261/94 |
| 2007/0096347 A1 | | 5/2007 | Bessettes et al. | |

FOREIGN PATENT DOCUMENTS

| | | |
|---|---|---|
| CN | 1 076 384 A | 9/1993 |
| CN | 1 095 966 | 12/1994 |
| EP | 0 449 040 B1 | 3/1991 |
| FR | 1 193 405 A | 11/1959 |
| FR | 2 892 644 A | 5/2007 |

* cited by examiner

*Primary Examiner* — Duane Smith
*Assistant Examiner* — Pankti Patel
(74) *Attorney, Agent, or Firm* — Antonelli, Terry, Stout & Kraus, LLP.

(57) ABSTRACT

A packing structure according to the invention for a fluid contacting column forms a volume comprising an ordered arrangement of bundles of tubes of diameter ranging between 5 and 50 mm. The walls of the tubes comprise orifices which promote circulation and mixes fluids in the structure. The orifices are inscribed in rectangles whose sides range between 2 and 45 mm, and each one of the orifices extends over a surface area greater than 2 mm².

41 Claims, 7 Drawing Sheets

PACKING STRUCTURE FOR FLUID CONTAINING COLUMN AND MANUFACTURING METHOD

BACKGROUND OF THE INVENTION

1. Field of the Invention

The present invention relates to the sphere of fluid contacting equipments.

2. Description of the Prior Art

Contacting columns provide contact between fluids in order to achieve matter or heat transfers between the fluids. This type of fluid contacting equipment is widely used to carry out distillation, rectification, absorption, heat exchange, extraction, chemical reaction operations, etc.

Contacting columns are generally an enclosure provided with internal contacting elements promoting exchange between the fluids. In general, the column allows intimate contact between an ascending gas phase and a descending liquid phase, or vice versa. In the column, the fluids can circulate in a cocurrent or a countercurrent flow. The contacting elements that increase the contact surface between the fluids can be trays, an ordered packing, that is the juxtaposition of several unitary elements, identical or not, arranged in an ordered manner, such as corrugated sheets for example, or a random packing of anarchic piles of unitary elements of, for example rings or spirals.

EP-0,449,040 describes internal packing elements allowing better control of exchanges between fluids, to push back the fluid circulation block limits while providing increased resistance to chemical aggressions or corrosion.

In the applications of fluid contacting columns, notably, such as, reactive absorption or distillation requiring washing a fluid with an absorbent solution, for example natural gas deacidizing or combustion fumes decarbonation, it is essential to have the best possible contacting elements providing a maximum contact surface while limiting pressure drop in the columns.

SUMMARY OF THE INVENTION

The present invention is an internal packing structure for a fluid contacting column, which is well suited for reactive absorption and distillation applications, notably allowing an increase in the exchange surface between the fluids while limiting the increase in pressure drop.

In general terms, the invention is a packing structure for a fluid contacting column, the structure forming a volume comprising an ordered arrangement of bundles of tubes of diameter ranging between 5 and 50 mm, the walls of said tubes comprising orifices arranged so as to promote circulation and mixing of the fluids in the structure, the orifices being inscribed in rectangles whose sides, for example, range between 2 and 45 mm, and each one of the orifices extending over a surface area greater than 2 mm$^2$.

According to the invention, the ratio of the surface area of the orifices to the surface area of the solid part of a tube can range between 10% and 90%.

The space between two orifices may not exceed twice the diameter of the tube.

The tubes can comprise a cloth of at least two, but preferably four, strips wound as two. Preferably four crossed helices extend along a same axis and with the same diameter. Preferably two of the helices cross the other two helices. The strips are separate from one another to form the orifices. The strips can comprise at least one of the following materials: carbon congealed by carbon deposition, metal, ceramic, a thermoplastic material and a thermosetting material.

According to the invention, each tube bundle can comprise two tubes respectively oriented in two directions.

Alternatively, each tube bundle can comprise four tubes respectively oriented in four directions. The four tubes can be respectively oriented along the four directions of a cube.

The packing structure according to the invention can be used in a distillation process.

The packing structure according to the invention can also be implemented in a reactive absorption process such as carbon dioxide capture in post-combustion and natural gas treatment.

The invention also describes a method of manufacturing a packing structure for a fluid contacting column, wherein the following stages are carried out:

a) manufacturing tubes of a diameter ranging between 5 and 50 mm, the walls of the tubes comprising orifices for promoting circulation and mixing of the fluids in the structure, the orifices being inscribed in rectangles whose sides range between 2 and 45 mm, and each one of the orifices extending over a surface area greater than 2 mm$^2$, b) building an ordered assembly of the tubes by juxtaposing bundles of tubes, c) linking the tubes at the level of a contact portion therebetween, d) machining an ordered assembly forming the packing structure fitting internal dimensions of a contacting column.

In a), it is possible to wind around a cylinder strips, for example yarns, threads or sheets, of composite material in form of at least two crossed helices while leaving spaces between the strips so as to form said orifices between the strips. The strips can comprise at least one of the following materials: carbon fibers congealed by carbon deposition, metal, a thermoplastic material and a thermosetting material.

In b), the tube bundles can extend in two directions, or four directions.

BRIEF DESCRIPTION OF THE DRAWINGS

Other features and advantages of the invention will be clear from reading the description hereafter, with reference to the accompanying figures wherein:

FIG. 1 shows a tubular packing element according to the invention; wherein

DETAILED DESCRIPTION OF THE INVENTION

Figure 1:
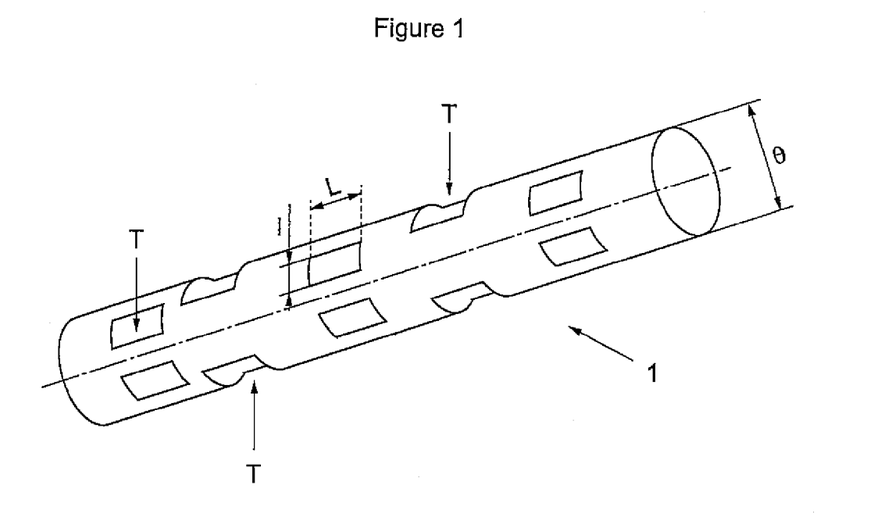

FIG. 1 shows a tubular element 1 forming the base pattern of an ordered packing according to the invention. Element 1 has a wall in form of a tube of diameter θ provided with orifices or holes T. According to the invention, the dimensions of orifices T and of diameter θ are selected to optimize fluid circulation and contact. Diameter θ of tubular element 1 ranges between 5 and 50 mm so as to optimize the geometrical area per unit of volume of an ordered packing made up of such tubes. These dimensions allow developing a sufficient geometrical area per unit of volume while maintaining a low pressure drop.

The minimum surface area of orifices T is selected greater than 2 mm$^2$, preferably 4 mm$^2$, so that the liquid film that flows within the tubes can be broken by a gas stream flowing through the orifices. In fact, if the size of orifices T is smaller than 2 mm$^2$, the liquid film that circulates on the inner wall of a tube might clog these orifices through capillarity. The orifices having a surface area above 2 mm$^2$ allow passage of the gas and liquid phases from one tube to the other and thus provide proper contact and mixing. In the application of the packing according to the invention to reactive absorption, tubes provided with orifices whose surface area is greater than 4 mm$^2$ or even 8 mm$^2$ are preferably used. In fact, in general, the fluids contacted in a reactive absorption column circulate at high rates, typically rates ranging between 1 m/s and 2 m/s. Larger orifices are therefore provided to fragment the liquid film circulating on the tube walls.

Figure 1A:
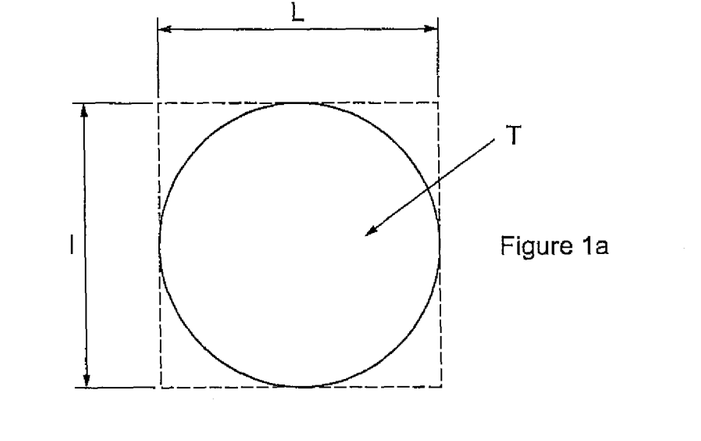
FIGS. 1a, 1b and 1c show various examples of shape of orifices provided in the tubular packing elements.
Figure 1B:
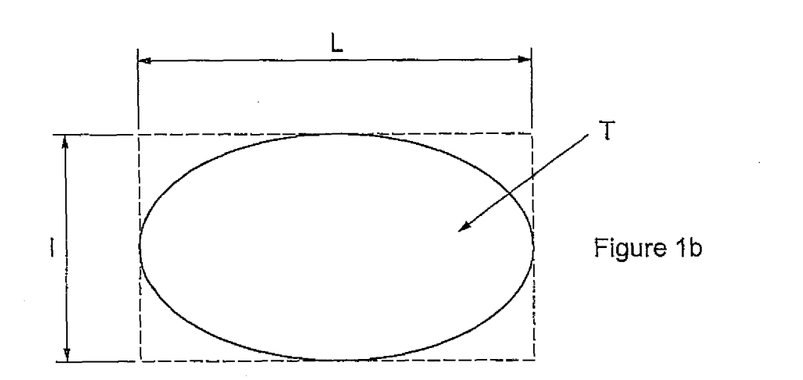
Figure 1C:
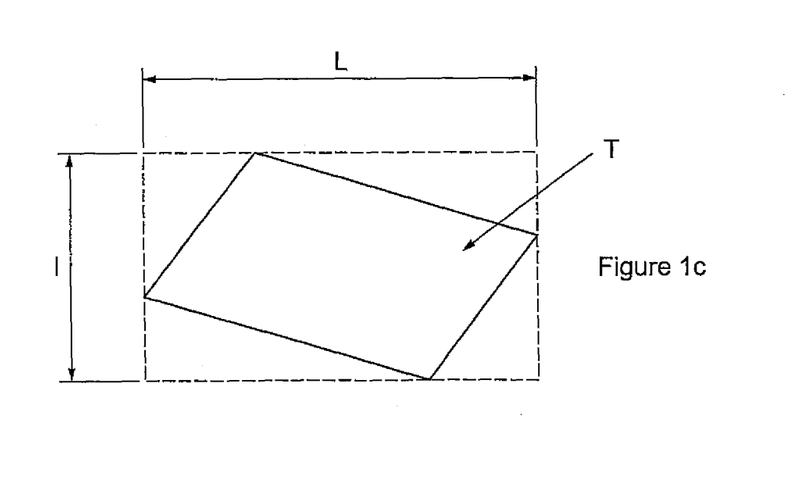

Orifices T are inscribed in rectangles whose length L and width I range between 2 and 45 mm, preferably between 3 and 20 mm. In other words, an orifice must touch the four sides of a rectangle of length L and width I. On the other hand, an orifice T can have any shape provided that it remains inscribed in a rectangle of dimensions L and I. FIGS. 1a, 1b and 1c show various non limitative examples of shapes for orifices T inscribed in rectangles of length L and width I. In FIG. 1a, the orifice is of substantially circular shape. In FIG. 1b, the orifice has the shape of an ellipse. In FIG. 1c, it is close to the shape of a diamond. Inscribing the orifices in rectangles of dimensions L and I allows imposing a minimum dimension between the edges of the orifices in order to cause breaking of the liquid film circulating on the wall of the packing tubes.

Orifices T are arranged in an ordered or random manner. Preferably, orifices T are regularly arranged so as to obtain homogeneous exchange characteristics along element 1. Preferably, the space between two orifices does not exceed twice the value of diameter θ. The number of orifices can be selected in such a way that element 1 comprises between 10% and 90% opening. That is, the ratio of the surface area of the orifices to the surface area of the solid part of the tube ranges between 10% and 90% with an excellent value for this ratio ranging between 25% and 50%.

Orifices T as defined above open communication channels for the fluid between the inside and the outside of element 1 in order to optimize mixing between the phases providing contact and redistribution between the phases circulating in an ordered packing made up of elements 1.

The walls of element 1 can be made of any type of material, such as carbon/carbon for example. That is, a structure made of carbon fibers congealed by carbon deposition, ceramic, metal, polymer material, thermoplastic material or thermosetting material. Orifices T can be obtained through material removal, machining or boring. Element 1 can be obtained by molding, a polymer material for example, by forming or by any other method.

Figure 2:
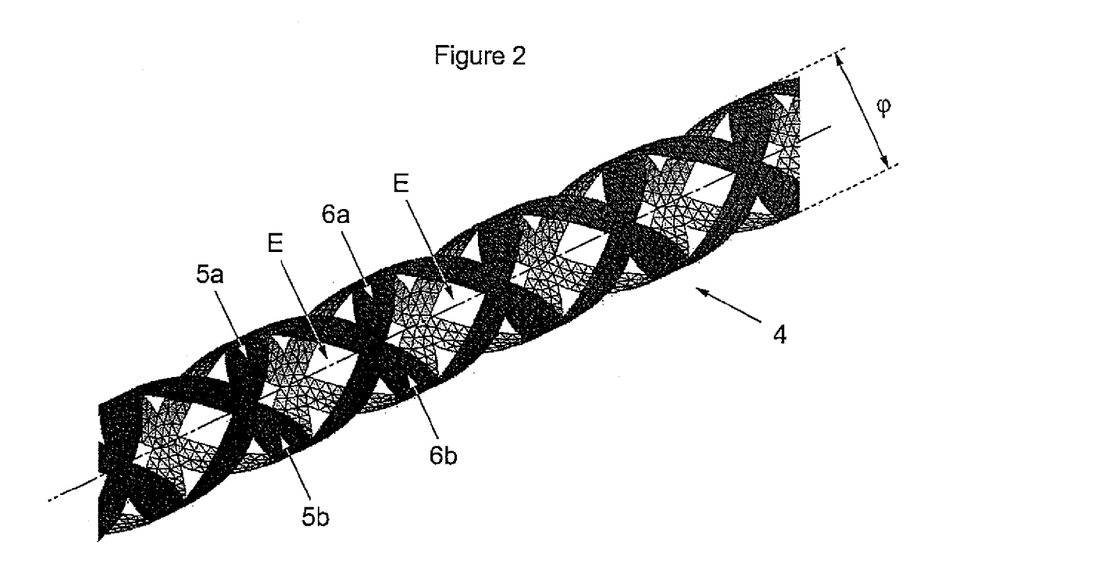
FIG. 2 shows a particular embodiment of a packing element according to the invention.

FIG. 2 shows a particular embodiment of element 1 of FIG. 1 obtained by braiding strips. Tubular element 4 of FIG. 2 is made by weaving strips, for example yarns, threads, sheets, taking a tubular shape. More precisely, a strip 5a is wound, by forming a helix, around a tube of diameter φ. A second strip 5b is also wound, by forming a helix, around the same tube but while crossing strip 5a. The thickness of the strips and the pitch of the helix are so selected as to leave spaces E between the strips. Preferably, the pitch of helix 5a is identical to the pitch of helix 5b. Spaces E fulfil the same purpose as orifices T of FIG. 1. The geometrical definitions of spaces E and of diameter φ are respectively identical to those of orifices T and diameter θ described in connection with FIG. 1.

Furthermore, in FIG. 2, the packing element comprises two additional strips 6a and 6b wound as helices respectively identical to those of strips 5a and 5b and axially offset. Thus, spaces E have substantially the shape of diamonds whose sides are materialized by strips 5a, 5b, 6a and 6b.

Without departing from the scope of the invention, tubular elements 4 can be made by varying different parameters, for example the number of strips, the thickness and the width of the strips, the pitch of the winding helix, or strips can be wound as variable-pitch helices.

Once winding of the strips is complete, the woven strip structure is congealed using for example a technique described in EP-0,499,040, by thermal treatment, resin impregnation, bonding or any other technique. A coking and infiltratable resin such as a phenolic resin can be used and the resin is cross-linked through thermal treatment.

For example, the strips are yarns made of glass or carbon fibers, possibly coated with a thermosetting material.

Figure 3:
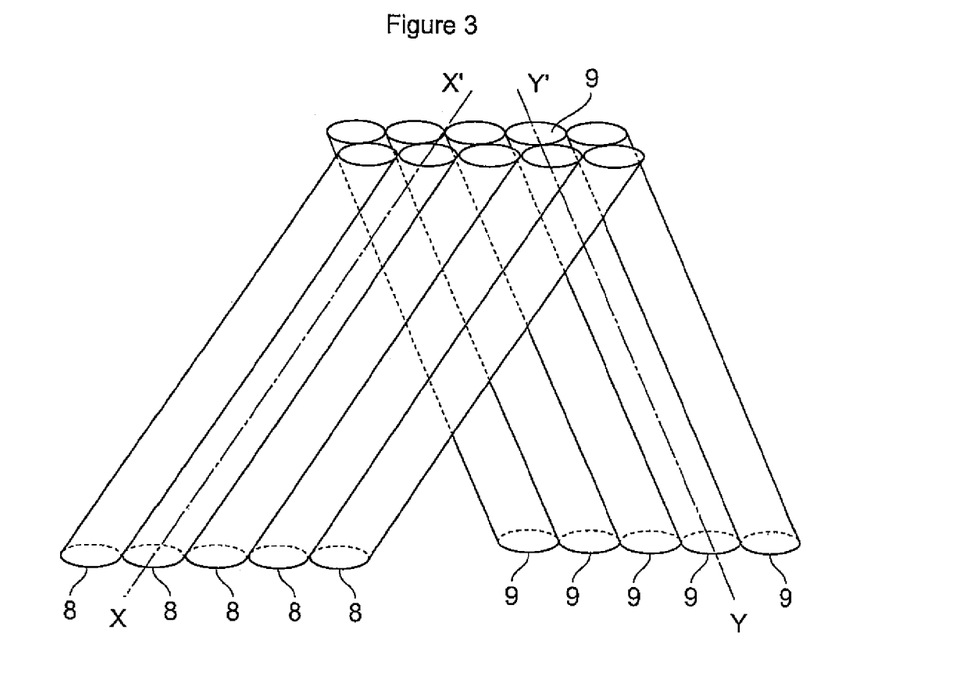
FIGS. 3 and 4 diagrammatically show ordered packings based on tubular elements oriented in two directions.
Figure 4:
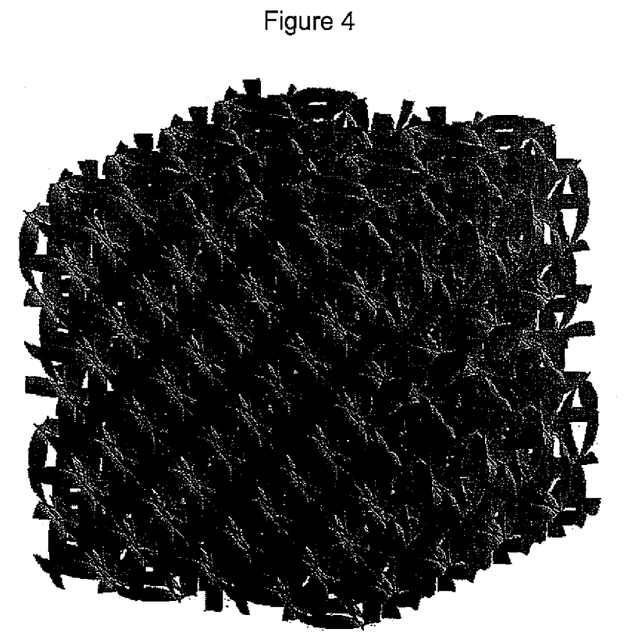

FIG. 3 shows an assembly of tubular elements according to the invention for making up an inner packing for a fluid contacting column. In FIG. 3, the tubular elements are arranged alternately in two directions defined by axes XX' and YY'. A first layer of tubes 8 oriented in the same direction as axis XX' is first arranged. The axes of tubes 8 of the first layer are located substantially in the same plane so as to form a plane layer. A tube 8 is in contact with adjacent tubes 8 along straight lines. A second layer of tubes 9, which is oriented in the direction of axis YY', is then arranged. This second layer is piled on the first layer of tubes 8. A third layer of tubes is then piled on the second layer. The tubes of this third layer are oriented in the direction of axis XX'. And so on, layers of tubes are piled on one another by alternating the orientation of the tubes until a compact block with the desired dimensions is obtained as shown in FIG. 4.

Figure 5:
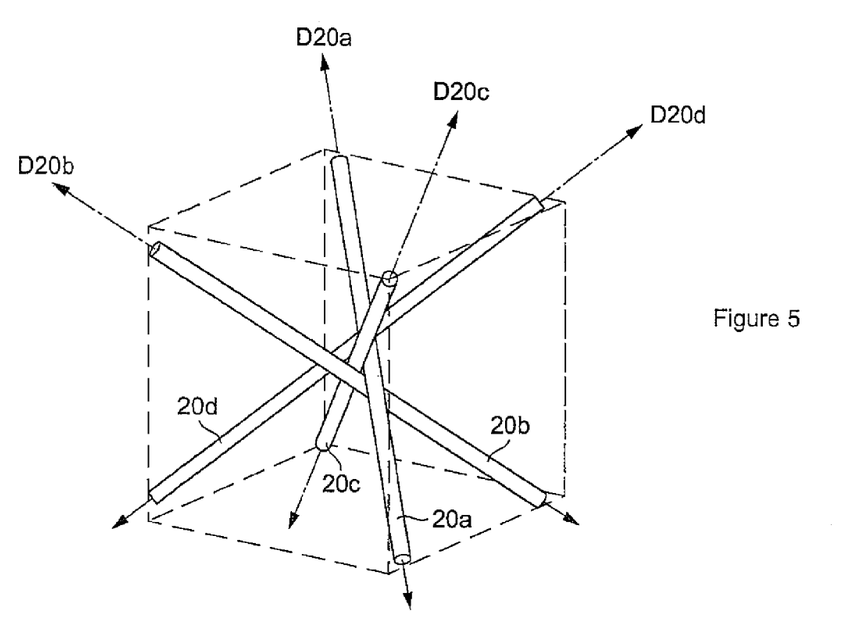
FIGS. 5 to 8 diagrammatically show ordered packings based on tubular elements oriented in four directions.
Figure 7:
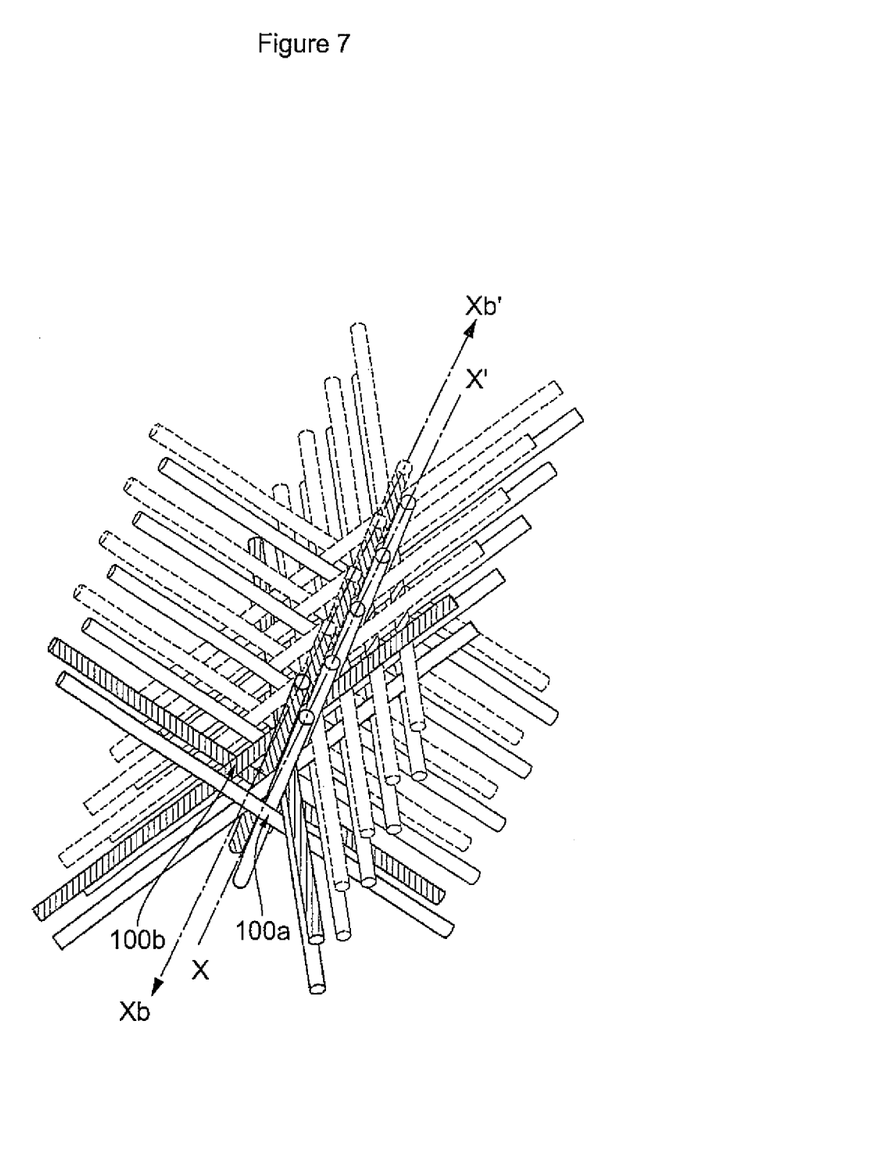
Figure 8:
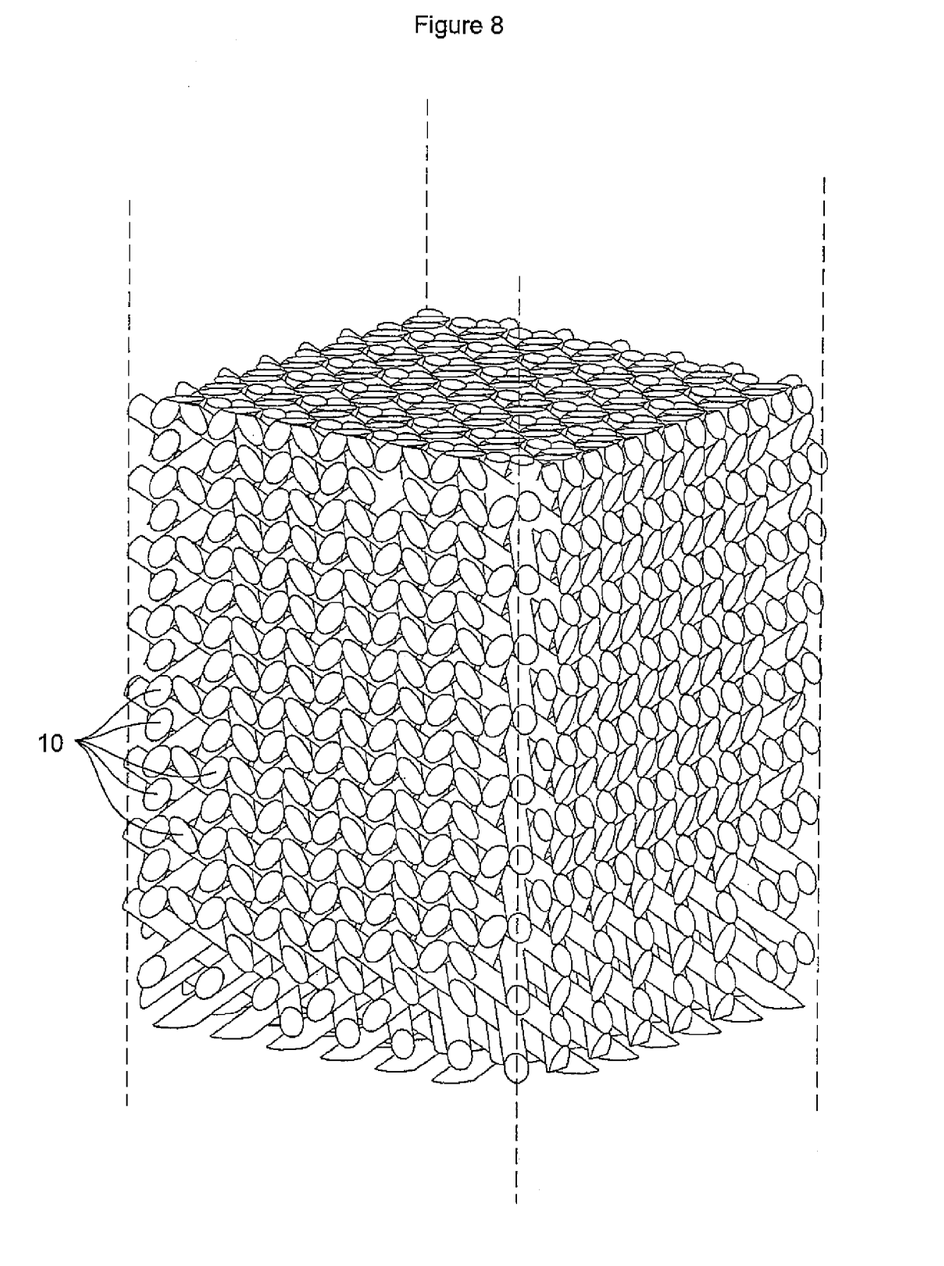

FIG. 8 shows another assembly of tubular elements according to the invention. The tubes are arranged in four distinct directions. The detailed layout of this assembly is described in connection with FIGS. 5, 6 and 7. FIG. 5 illustrates a bundle of four tubes 20a to 20d, each arranged in one of the four assembly directions D20a to D20d. The four directions D20a to D20d along which the tubes are assembled correspond here respectively to the four diagonals of a cube (or four heights/edges of a regular tetrahedron), apart from the fact that the tubes do not intersect at the level of the intersection of the diagonals at the center of the cube, they cross in the vicinity of this point.

Figure 6:
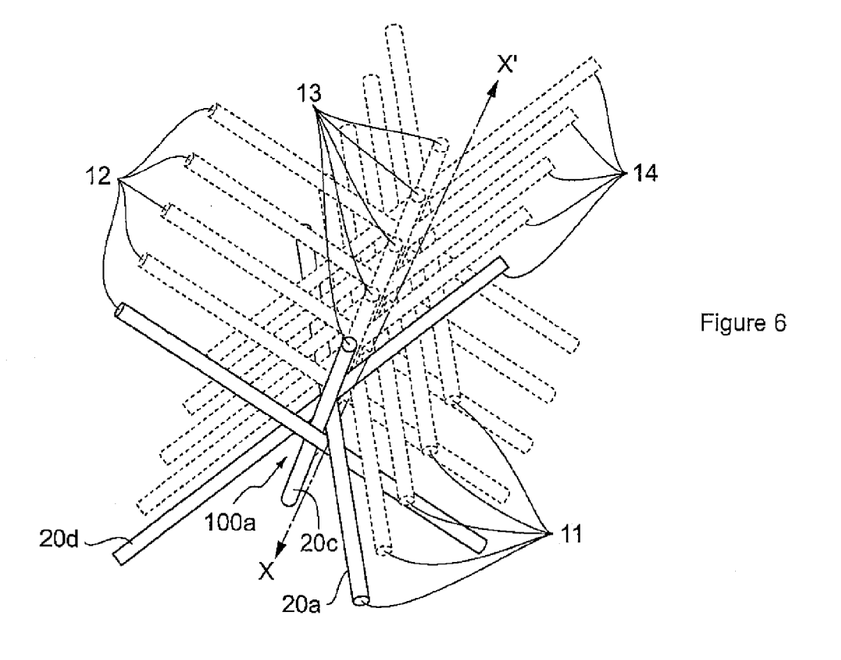

Construction of the ordered assembly can start for example by repeating the layout of FIG. 5. That is, by arranging along a construction axis XX', corresponding to the intersecting point of the four tubes of a bundle, a new bundle of tubes 20a to 20d arranged in the same order as the previous bundle, and so on. The start of an ordered assembly of a first row 100a of bundles of tubes 20a to 20d aligned along the axis is thus obtained, as shown in FIG. 6. Four intertwined networks of tubes 11 to 14 extending each in a plane oriented in one of the four directions of assembly of the tubes in a bundle are thus formed. The tubes of each network are spaced out from one another by a distance allowing passage (intersection) of the tubes of the other networks.

When the desired number of bundles is reached in row 100a, several series of rows of bundles are then superposed along axes parallel to axis XX' so as to fill the free volume around row 100a. FIG. 7 illustrates the layout of an additional row 110b of bundles along a new axis parallel to construction axis XX'. The free volume on either side of row 110a is then similarly completed, typically up to the end of the tubes of row 100a, so as to obtain in this volume a three-dimensional structure of tubes respectively arranged in four directions.

In the tube assemblies described in connection with FIGS. 4 and 8, the tubes are connected to one another at the level of the contact portions between tubes. The connection can be achieved by means of a chemical or mechanical process, for example by means of a thermosetting material, through welding, carbon deposition.

The ordered packing blocks described in connection with FIGS. 4 and 8 can be machined to the dimensions and the shape of the contacting column. In general, contacting columns comprise a cylindrical enclosure. In this case, the ordered tube assembly is machined in order to obtain a packing structure of cylindrical shape that can be introduced into the cylindrical enclosure of the column so as to occupy a maximum space in the column and thus to provide an optimum exchange surface. For large-diameter columns, several blocks are juxtaposed. The blocks located on the inner periphery of the walls are machined to suit the cylindrical shape of the column. Machining the blocks made up of the assembly of tubular elements is very delicate considering the high intrinsic porosity of the construction. According to the nature of the materials, particular machining techniques are used to avoid buckling of the elements or collapse of the structure.

Figure 9:
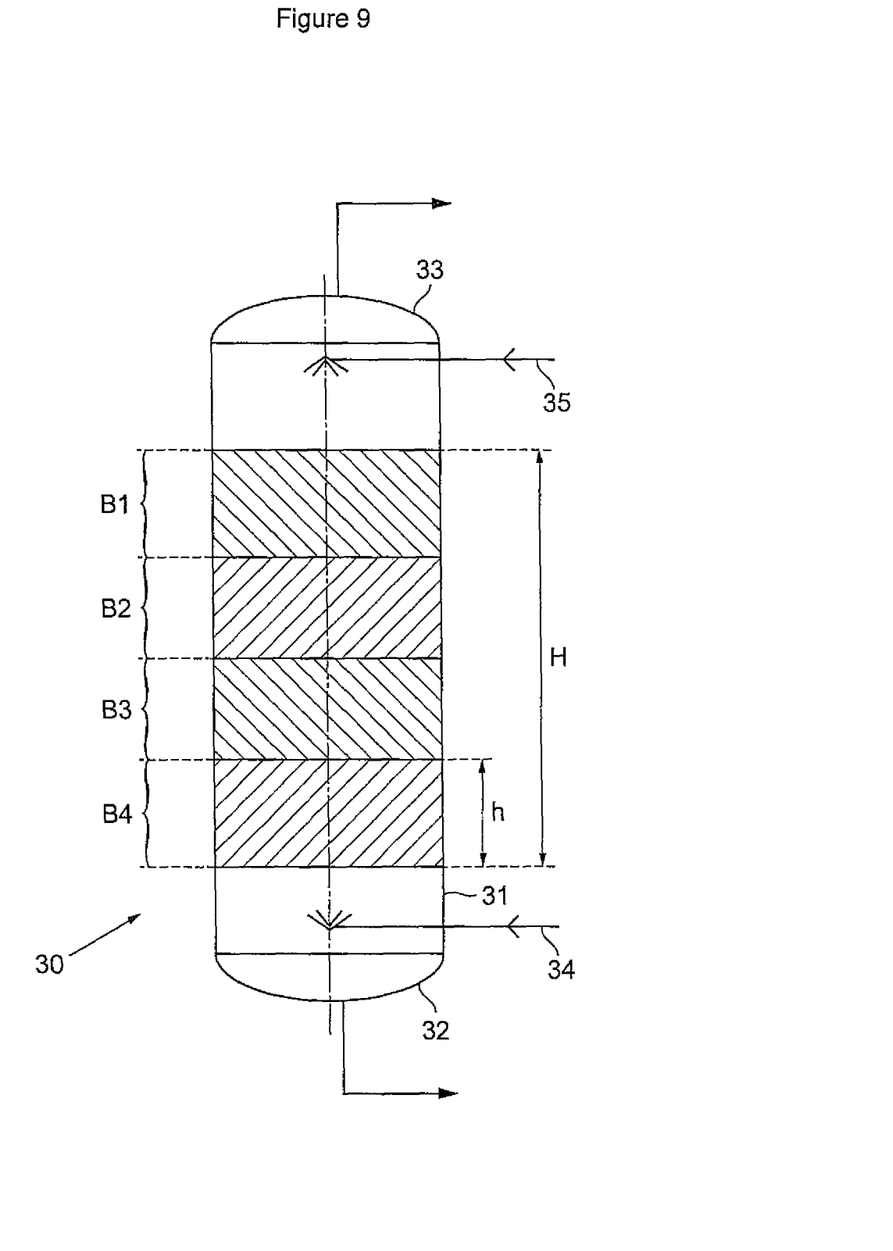
FIG. 9 diagrammatically shows a contacting column.

FIG. 9 shows a contacting column 30 having a cylindrical enclosure 31 closed by bottom parts 32 and 33. A fluid, gas for example, is fed into the column bottom through line 34. Another fluid, liquid for example, is fed into the column top through line 35. These two fluids come into contact in the space located between the column inlets through lines 34 and 35. In order to improve contacting and to promote matter and heat transfer, column 30 is provided with a packing over a height H that can reach several tens of meters. According to the invention, the packing is made up of tubes described in connection with FIG. 1 or 2 and arranged for example according to the layouts described in connection with FIG. 4 or 8. Preferably, according to the invention, a packing having blocks B1, B2, B3 and B4 wherein the tubes are oriented differently from one block to the next is used. For example, the packing having an alternation of blocks of tubes oriented in directions forming angles greater than 45° to the horizontal and blocks of tubes oriented in directions forming angles smaller than 45° to the horizontal. For example, the tubes of a block are arranged in perpendicular directions with respect to the adjacent blocks. Furthermore, the height h of a block can be limited to a limit value ranging, for example, between 50 and 500 mm which is preferably between 100 and 400 mm for feeding the blocks into the cylindrical enclosure during assembly of the column. This orientation alternation of the tubes of the various blocks, associated with a limited height of each block, prevents concentration of the liquid on the inner wall of enclosure 31, which would cause a decrease in the contact area.

The inner packing of the contacting column according to the present invention allows obtaining excellent results in distillation operations, notably for the preparation of fluorine derivatives requiring distillation in the presence of HF (hydrofluoric acid) or distillation of certain organic acids such as formic acid or acetic acid. It is also particularly well suited for reactive absorption applications, notably carbon dioxide capture in post-combustion and natural gas treatment, by contacting with an absorbent liquid solution.

The numerical example below allows comparison of a packing having continuous tubes, that is without orifices, arranged according to the layout of FIG. 4, and the same packing having tubes according to the invention, that is with openings. The results were obtained by carrying out numerical computations with the Fluent numerical flow simulation software.

The pressure drop of a gas circulating through the packing was determined for different gas superficial velocities Vsg (1 m/s and 2 m/s). These superficial velocities are obtained by calculating the ratio of the gas flow rate to the total section of the contacting column.

The simulations were performed to determine the following pressure drops:
1) Pressure drops Dpref for a packing having continuous tubes without openings (diameter 10 mm),
2) Pressure drops DP for a packing of similar geometry to case 1), except that the tubes comprise openings (diameter 10 mm; orifices in the shape of diamonds of 12 mm in length and 9 mm in width; surface area of an orifice of approximately 60 mm$^2$; space between two orifices of 3 mm; and an opening ratio of 46%).

The results are shown in the table hereunder, which gives the DP/Dpref ratio.

| Opening ratio | Vsg (m/s) | DP/DPref |
|---|---|---|
| Packing with 46% open tube | 1 | 0.598 |
|  | 2 | 0.728 |

It is observed that, when opening the tubes have a 46% opening ratio, the pressure drop is decreased by 30% to 40%.

The invention claimed is:

1. A packing structure for a fluid contacting column, comprising a volume including an ordered arrangement of bundles of tubes of a diameter ranging between 5 and 50 mm wherein walls of the tubes comprise orifices promoting circulation and mixing of the fluids in the structure, each of the orifices being inscribed in a rectangle with sides ranging between 2 and 45 mm, and each orifice extending over a surface area greater than 2 mm$^2$.

2. A packing structure as claimed in claim 1, wherein a ratio of surface area of the orifices to the surface area of a solid part of a tube ranges between 10% and 90%.

3. A packing structure as claimed in claim 1 wherein a space between adjacent orifices is not greater than twice a diameter of the tube.

4. A packing structure as claimed in claim 2 wherein a space between adjacent orifices is not greater than twice a diameter of the tube.

5. A packing structure as claimed in claim 1, wherein the tubes comprise a cloth of at least two strips forming two crossed helices extending along a same axis and with an identical diameter and the strips being spaced apart to form the orifices.

6. A packing structure as claimed in claim 2, wherein the tubes comprise a cloth of at least two strips forming two crossed helices extending along a same axis and with an identical diameter and the strips being spaced apart to form the orifices.

7. A packing structure as claimed in claim 3, wherein the tubes comprise a cloth of at least two strips forming two crossed helices extending along a same axis and with an identical diameter and the strips being spaced apart to form the orifices.

8. A packing structure as claimed in claim 4, wherein the tubes comprise a cloth of at least two strips forming two crossed helices extending along a same axis and with an identical diameter and the strips being spaced apart to form the orifices.

9. A packing structure as claimed in claim 1, wherein the strips comprise at least one of the following materials: carbon congealed by carbon deposition, metal, ceramic, a thermoplastic material and a thermosetting material.

10. A packing structure as claimed in claim 2, wherein the strips comprise at least one of the following materials: carbon congealed by carbon deposition, metal, ceramic, a thermoplastic material and a thermosetting material.

11. A packing structure as claimed in claim 3, wherein the strips comprise at least one of the following materials: carbon congealed by carbon deposition, metal, ceramic, a thermoplastic material and a thermosetting material.

12. A packing structure as claimed in claim 4, wherein the strips comprise at least one of the following materials: carbon congealed by carbon deposition, metal, ceramic, a thermoplastic material and a thermosetting material.

13. A packing structure as claimed in claim 5, wherein the strips comprise at least one of the following materials: carbon congealed by carbon deposition, metal, ceramic, a thermoplastic material and a thermosetting material.

14. A packing structure as claimed in claim 6, wherein the strips comprise at least one of the following materials: carbon congealed by carbon deposition, metal, ceramic, a thermoplastic material and a thermosetting material.

15. A packing structure as claimed in claim 7, wherein the strips comprise at least one of the following materials: carbon congealed by carbon deposition, metal, ceramic, a thermoplastic material and a thermosetting material.

16. A packing structure as claimed in claim 8, wherein the strips comprise at least one of the following materials: carbon congealed by carbon deposition, metal, ceramic, a thermoplastic material and a thermosetting material.

17. A packing structure as claimed in claim 1, wherein each bundle comprises two tubes respectively oriented in different directions.

18. A packing structure as claimed in claim 2, wherein each bundle comprises two tubes respectively oriented in different directions.

19. A packing structure as claimed in claim 3, wherein each bundle comprises two tubes respectively oriented in different directions.

20. A packing structure as claimed in claim 4, wherein each bundle comprises two tubes respectively oriented in different directions.

21. A packing structure as claimed in claim 5, wherein each bundle comprises two tubes respectively oriented in different directions.

22. A packing structure as claimed in claim 6, wherein each bundle comprises two tubes respectively oriented in different directions.

23. A packing structure as claimed in claim 7, wherein each bundle comprises two tubes respectively oriented in different directions.

24. A packing structure as claimed in claim 8, wherein each bundle comprises two tubes respectively oriented in different directions.

25. A packing structure as claimed in claim 9, wherein each bundle comprises two tubes respectively oriented in different directions.

26. A packing structure as claimed in claim 10, wherein each bundle comprises two tubes respectively oriented in different directions.

27. A packing structure as claimed in claim 11, wherein each bundle comprises two tubes respectively oriented in different directions.

28. A packing structure as claimed in claim 12, wherein each bundle comprises two tubes respectively oriented in different directions.

29. A packing structure as claimed in claim 13, wherein each bundle comprises two tubes respectively oriented in different directions.

30. A packing structure as claimed in claim 14, wherein each bundle comprises two tubes respectively oriented in different directions.

31. A packing structure as claimed in claim 15, wherein each bundle comprises two tubes respectively oriented in different directions.

32. A packing structure as claimed in claim 16, wherein each bundle comprises two tubes respectively oriented in different directions.

33. A packing structure as claimed in claim 1, wherein each bundle comprises four tubes respectively oriented in four different directions.

34. A packing structure as claimed in claim 2, wherein each bundle comprises four tubes respectively oriented in four different directions.

35. A packing structure as claimed in claim 3, wherein each bundle comprises four tubes respectively oriented in four different directions.

36. A packing structure as claimed in claim 4, wherein each bundle comprises four tubes respectively oriented in four different directions.

37. A packing structure as claimed in claim 5, wherein each bundle comprises four tubes respectively oriented in four different directions.

38. A packing structure as claimed in claim 6, wherein each bundle comprises four tubes respectively oriented in four different directions.

39. A packing structure as claimed in claim 7, wherein each bundle comprises four tubes respectively oriented in four different directions.

40. A packing structure as claimed in claim 8, wherein each bundle comprises four tubes respectively oriented in four different directions.

41. A packing structure as claimed in claim 23, wherein the four tubes are respectively oriented in four directions of a cube.

* * * * *